No. 742,986. PATENTED NOV. 3, 1903.
G. W. HOPKINS.
NEBULIZER.
APPLICATION FILED SEPT. 16, 1902.
NO MODEL. 4 SHEETS—SHEET 3.
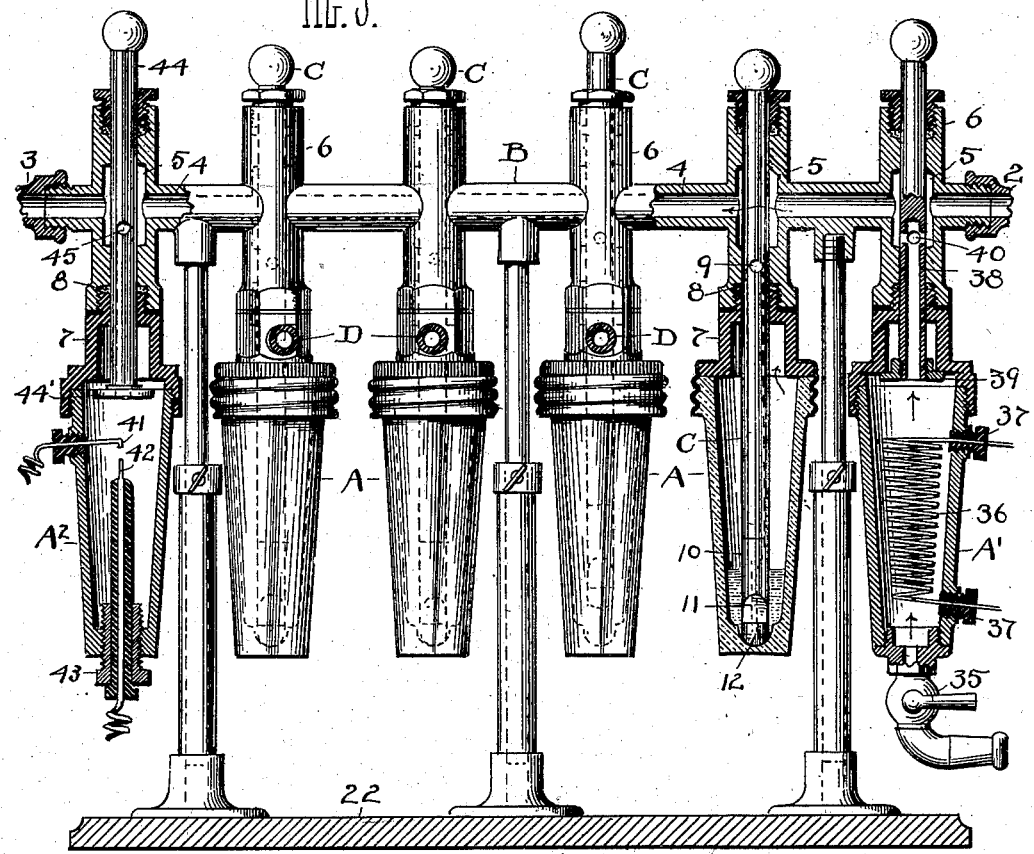
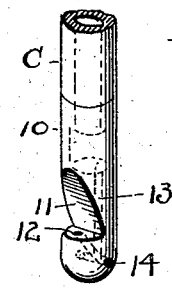
ATTEST
R. B. Moser
A. N. Moser
INVENTOR
George W. Hopkins
BY W. T. Fisher
ATTY

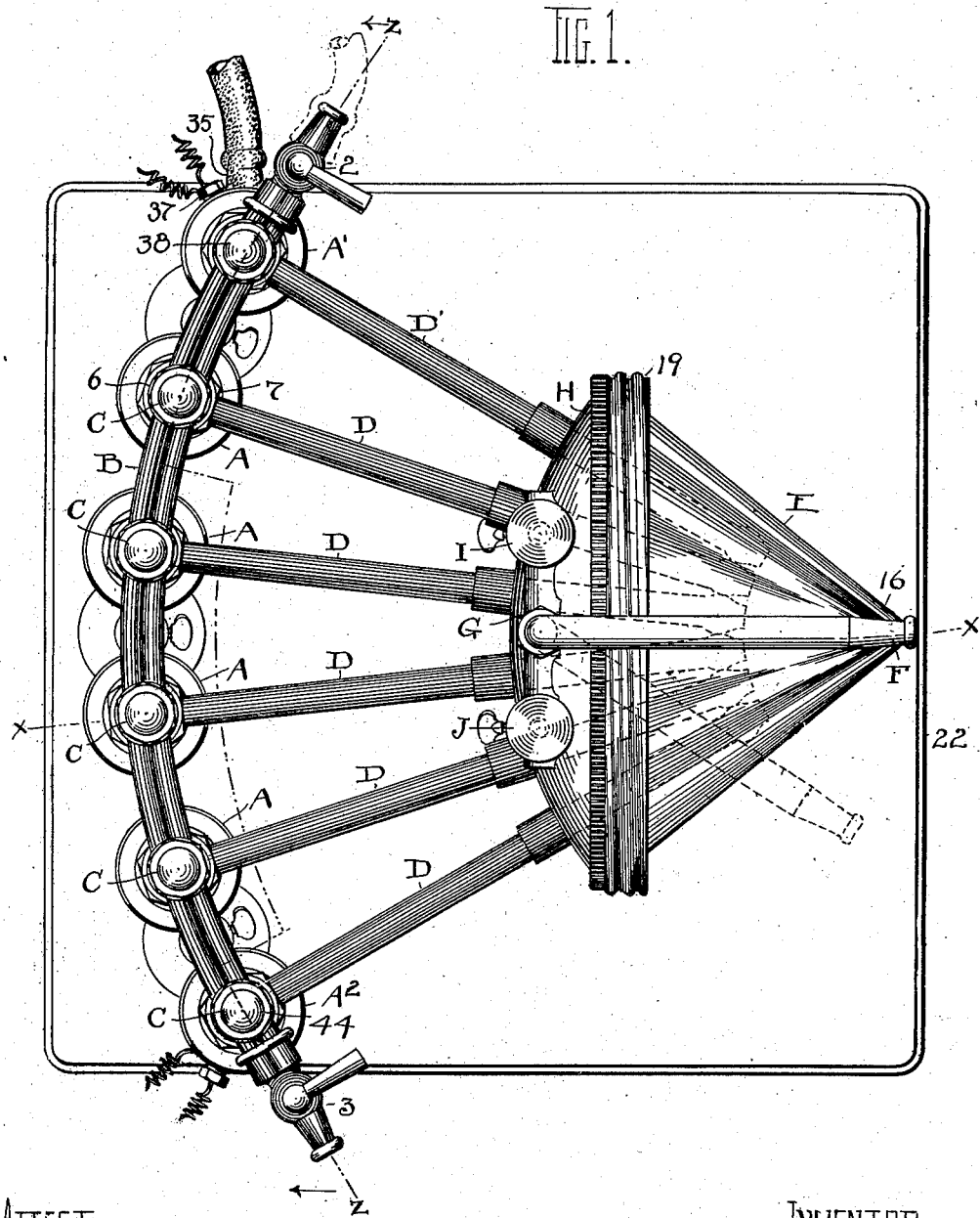

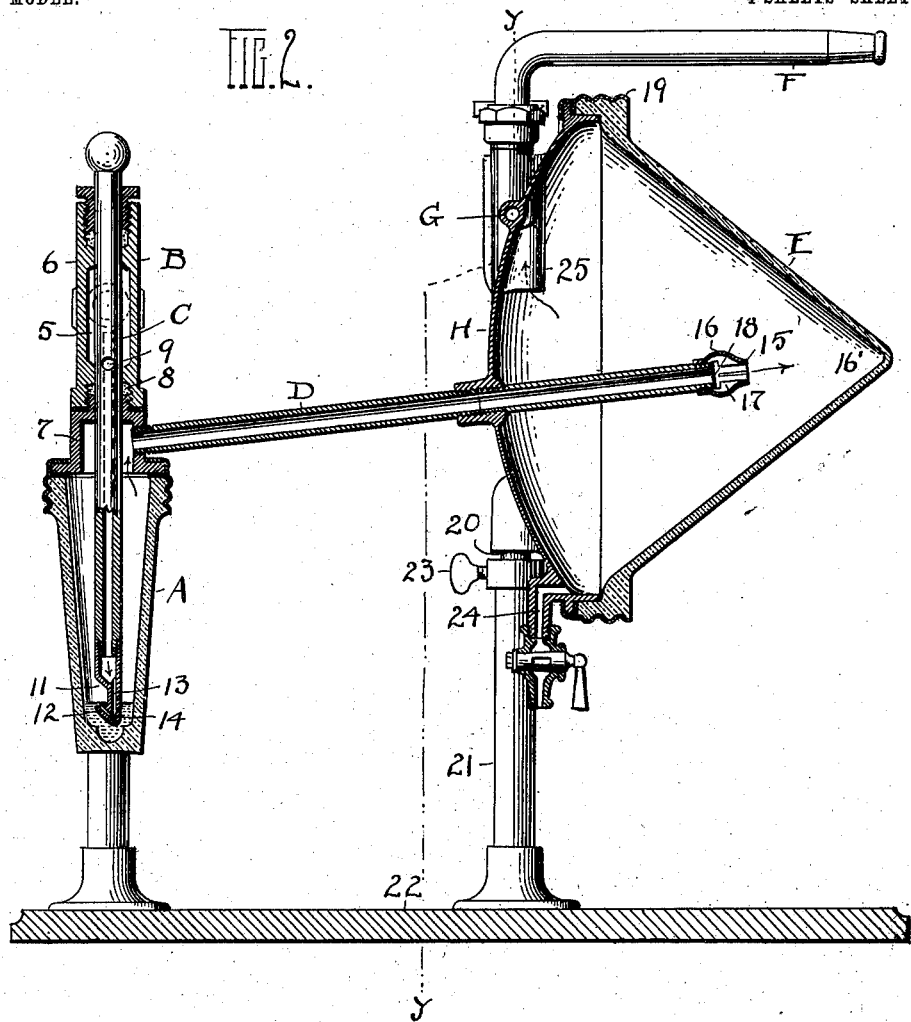

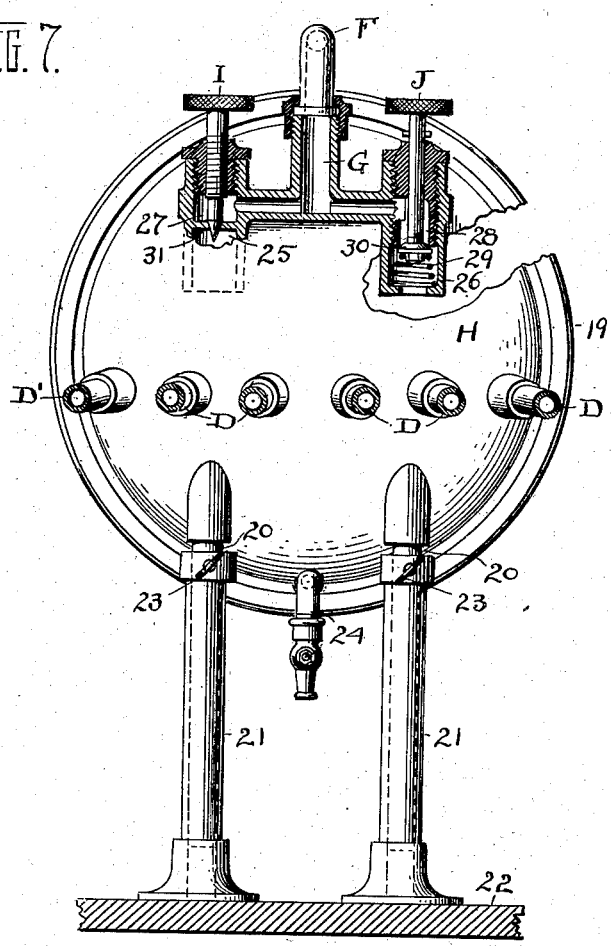

No. 742,986. Patented November 3, 1903.

UNITED STATES PATENT OFFICE.

GEORGE W. HOPKINS, OF CLEVELAND, OHIO, ASSIGNOR TO THE TERRY HEATER COMPANY, OF CLEVELAND, OHIO, A CORPORATION OF OHIO.

NEBULIZER.

SPECIFICATION forming part of Letters Patent No. 742,986, dated November 3, 1903.

Application filed September 16, 1902. Serial No. 123,668. (No model.)

*To all whom it may concern:*

Be it known that I, GEORGE W. HOPKINS, a citizen of the United States, residing at Cleveland, in the county of Cuyahoga and State of Ohio, have invented certain new and useful Improvements in Nebulizers; and I do declare that the following is a full, clear, and exact description of the invention, which will enable others skilled in the art to which it appertains to make and use the same.

My invention relates to improvements in nebulizers or atomizers; and the improvement consists in the novel construction and arrangements of parts, all as hereinafter shown and described, and more particularly pointed out in the claims.

The class of nebulizing or atomizing apparatus to which my improvement applies is that form of apparatus wherein two or more atomizing-bottles are grouped together and combine with a mixer to deliver a mixed vaporized product to the patient under treatment.

One of the objects of my improvement is to provide an efficient mixer, preferably of a cone shape, into the apex of which the various vapors are discharged and whereby thorough and complete mixing of the vapors is obtained.

Another object is to provide an air-supply tube or connection, which is common to all the atomizing-bottles and constructed with open-valved ends, thereby affording a direct connection with the air-supply for all the atomizing-bottles and at the same time permitting an open-air connection to be made with the air-supply for other instruments or apparatus, which may be necessary to use in combination with the atomizing apparatus.

A further object is embodied in the construction and arrangement of parts, whereby each atomizing-bottle is automatically closed or sealed to a backflow of the vapors within the mixer and whereby the solution or liquid in the individual atomizing-bottles is preserved in its original condition and kept free from the mixed vapors or condensed vapors from the other bottles.

A still further object is to provide the mixer with a valved drain-off connection to carry away all condensed vapors precipitated in the mixer, and thereby afford means to cleanse and empty the mixing-receptacles for a new combination of vapors.

Another object is provided for in the construction of the individual vapor-tubes leading to the mixer and whereby the condensed vapors in said tubes are drained back into their respective atomizing-bottles, thus effecting a saving of solution and also keeping said tubes and passages free and open and clean.

Another object is embodied in the narrow tapering construction of the solution or atomizing bottles which permits thorough vaporization with a minimum amount of solution.

A further object is to provide an atomizing-tube for the solution or atomizing bottles, which is adapted to operate with its air-outlet or vaporizing-passages or passages within the solution.

Another object is embodied in the adjustability of the atomizing-tubes to the level of the solution.

Other objects of importance are to provide means for heating the air in its passage to the atomizing-bottles and in the means for supplying and generating ozone within the apparatus, so that said ozone can be passed pure direct to the patient or combined with air or any vapor or pass into any solution or atomizing bottle to change the character of the solution therein.

In the accompanying drawings, Figure 1 is a plan view of my improved nebulizer or atomizer. Fig. 2 is a cross-sectional elevation on line $x\ x$, Fig. 1. Fig. 3 is a sectional detailed view of one form of the back-pressure valves on the end of a vapor-discharge tube. Fig. 4 is a cross-section on line $w\ w$, Fig. 3, showing the valve-nipple construction. Fig. 5 is a front elevation and sectional view on line $z\ z$, Fig. 1, showing the atomizing-bottles and the heating-bottle and ozone-bottle jointly supported on the common air-supply tube or connection. Fig. 6 is an enlarged detail view in perspective of the lower end of one of the atomizing-tubes. Fig. 7 is the end elevation of the vapor-mixer looking in from line $y\ y$, Fig. 2, and showing the valve construction controlling the vapor-outlet from said mixer. Fig. 8 is an enlarged sectional detail of a modification of the back-pressure valve.

Viewing my improved atomizer as a whole it will be seen to comprise a series of atomizing-bottles A, each of which is supported or suspended from an air-supply tube or connection B. Each bottle has its own atomizing-tube C and an individual vapor-discharge tube D. All of said discharge-tubes D converge in radial lines to the head or cap of a cone-shaped mixer E and extend within the mixer shell or casing to a point where their outlets are brought together to direct the vapor into the apex of the cone or mixer E. The mixed vapors are discharged and delivered to the patient taking treatment through an elbow or discharge tube F, which communicates with the passage or channel G in the head or cap H of the mixer. A set of valves I and J control the flow of vapor in its passage from mixer E to the discharge-tube F.

Now referring to the construction of the apparatus in detail the air-supply tube or connection B is shown arranged concentric or in a curved line to the mixer E and is provided with a valved air-inlet connection 2 at one end and a valved air outlet or pipe connection 3 at its opposite end, and an open passage 4 connects both ends.

Physicians' offices are as a rule provided with but a single source of air-supply, which may be in a form of a compressed-air tank or any other source of compressed-air supply. In either case a connection is made with the air-supply pipe, and usually this connection is more or less permanent.

The advantage of an open passage through tube B and the end connection 3 is that any other instrument or apparatus requiring air can be attached and used alone or in conjunction with my approved vaporizing apparatus.

Referring again to the air-supply tube B, connection-passage 4 is shown as opening into enlarged chambers 5, formed in vertical posts or bosses 6, and each post is arranged at equal distances apart from each other on tube B. Suspended from the lower end of these posts are the atomizing or solution bottles, which are provided with a screw-threaded neck at their upper end and by means of which a union or connection is made with the hollow cap or cover 7, which screws into the lower end of posts 6.

The vaporizing-tube C is supported centrally within post 6 and cap 7 and is adapted to have a close bearing fit therein and to slide up and down for the purposes hereinafter set forth. A packing-nut at the top and packing-ring 8 at the bottom of post 6 provide an air-tight bearing and also sufficient frictional engagement for the tube C to hold it in any position when raised or lowered, and an opening 9 in the upper end of said tube provides an inlet for the air to the atomizing-bottle. Chamber 5 is long enough to permit the tube to be raised a considerable distance without cutting off the air-supply. When tube C is depressed to its lowest limit, opening 9 is closed by the walls of post 6 and the air-supply is cut off from bottle A.

The lower end of atomizing-tube C is provided with a separate and removable part and has an offset or cut-away portion 11, through which a small duct or passage 12 is formed at an angle to a vertical passage 13, which communicates with the main air-passage in tube C. A cross-passage or duct 14 is formed at the intersection of passages 11 and 13 or at a lower point than the outlet-duct 12.

The advantages of the sliding or adjustable atomizing-tubes are as follows: The proper working relation of the atomizing-tube outlet with the level of the liquid within the bottle is easily accomplished by raising or lowering the tube, and satisfactory and thorough vaporization is thereby obtained. The tube can be set at any elevation in plain sight of the operator, as the bottles A are made of glass, through which the liquid and the tube C can be observed.

Heretofore great difficulty has been experienced in keeping the small outlets of the atomizing-tube clear and free from deposit, which is bound to occur where liquids are exposed to air within bottle. To keep said outlets open and free to do their work properly, an obvious remedy to prevent evaporation and hardening of the deposit at the atomizing-tube outlet would be to submerge the outlet end not only when in use, but especially when not in use. This can readily be done by an adjustable or depressible atomizing-tube, as above described.

A great many medicines used in an apparatus of this kind have insoluble elements which precipitate freely, and therefore when atomization is attempted only the lighter elements which are near the surface are carried out or vaporized. It is therefore desirable to agitate the solution or liquid to thoroughly mix the different elements, so that a proper proportion of the same will be vaporized. The cross-passage 14 is utilized to that end, as compressed air escapes through said passage and agitates the liquid.

Atomization or vaporization in any one of bottles A can proceed without affecting the solution in any of the other bottles, and two or more of the bottles may be in action at the same time, and in either case the air-pressure is from above through tube C, and the vapors are carried or forced out through the hollow cover 7, tube D, past back-pressure valves 15 at the opposite end of the tube, and into mixer E. If two or more vapors are passed into mixer E through their individual discharge-tubes D, they are discharged in converging lines within the apex 16' of the mixer and are thoroughly mixed as they cross each other's path and are thrown back by the cone.

In order that the various solutions in the bottle be kept pure and uncontaminated, I provide a back-pressure valve 15, which prevents a backflow of the vapor or mixed vapors in mixer E from entering pipes D, which lead back to their respective bottles. This is important, because with an apparatus of this kind it is necessary to have pure and unadulterated solutions to make perfect combinations in the proper proportions. The preferred form of back-pressure valve shown comprises a nipple with a circular body or shell 16, adapted to be screwed upon the end of pipe D. A series of ribs 17, having a shoulder, confines a diaphragn or disk valve 18, as seen in Fig. 2, or a ball 18', as seen in Fig. 3, and holds it in close working relation with the end of pipe D. The outgoing vapors carry the disk 18 or ball 18' back to the shoulder of ribs 17 and provide an open outlet for tube D; but all the bottles that are not under air-pressure and in use have the back-pressure valve of their respective tubes D closed by the back pressure of the vapors which are under compression in mixer E. Each tube D is set at an inclination from its inlet end at the bottle to its outlet end in the mixer, and when condensation of the vapors within tube D occurs the condensed vapor gravitates back into its respective bottle A and keeps the tube clean and free from deposit.

Mixer E is made in two parts, one of which is the cone-shell E, preferably of glass, and the other is the metal head or cap 8. A screw-ring 19 removably fastens the parts together. A pair of stems 20, rigid with the cap H, are mounted to slide in tube-uprights 21, which are fastened to the base 22, and thumb-screws 23 hold the parts at any desired elevation. The air-supply tube B is also provided with a similar set of stems and upright tubes, so that the structure as a whole can be raised and lowered to any elevation. Cap H is provided with a valve-drainage duct 24 at its bottom. The advantage of the drain at this point is apparent. The mixed vapors within the mixer E condense, and it is desirable to remove the precipitated matter whenever a new vapor or combination of vapors is brought about. If the condensed vapors of the previous mixtures were permitted to remain in the mixer, it would affect incoming vapors of the new mixtures.

The head or cap H is a circular concave convex shell, preferably of aluminium or some other non-corrosive metal, and has vapor-outlet passages 25 and 26, which lead to separate valve-chambers 27 and 28, respectively. A T-shaped passage or duct G connects chambers 27 and 28, and the vapors pass therefrom and out to the delivery or discharge tube F. Either of the valves I or J control the flow of vapor. Valve J is constructed to give an interrupted flow, but is normally held to its seat by a spring 29, confined within portion 26, thus closing the outlet-passage from this side. The operator can open and close the passage at will by operating valve J. If an uninterrupted flow of vapor is desired, valve I is rotated and unscrewed from its seat 31.

The vapor discharge or delivery tube F is preferably provided with a connection which permits it to be horizontally rotated and turned to any angle, thereby preventing twisting or damage to the rubber-tube connection which is usually made at the end thereof.

Now, referring again to air-supply tube B and bottles A, it will be seen that the end bottles A' and A² are placed and connected in series with the atomizing-bottles A; but in place of using atomizing-tubes therein I provide a different construction for the purpose hereinafter set forth. Thus bottle A' has an air-inlet 35 at its bottom, to which air connection can be made in lieu of connection 2. Inclosed within bottles A is a resistance-coil 36 for heating the air in its passage through the bottle and which has its electrical wire connections passing through suitable insulated screw-plugs 37 at the side of the bottle. Cap or cover 7 of this particular bottle also has a delivery-tube D', as seen in Fig. 1, leading to mixer E, and a sliding tubular valve-stem 38 controls the flow of air to and from the bottle. When stem 38 is in raised position, as in Fig. 5, valve 39 at its bottom cuts off the air to tube D', and the air passes through opening 40 into chamber 5 and through passages 4 to the bottle or bottles selected. Any suitable means for heating air in this passage may be used, and I do not wish to limit myself to the construction, as shown. It is highly desirable to have a heating arrangement in open connection and forming part of the apparatus where it can be controlled at the will of the operator, as it is often necessary to heat the vapors or the air in its passage from the bottle to the patient.

A further desirable feature of my improved apparatus is in the additional combination of an ozone-bottle A², arranged in series with bottle A and connected up in like manner with the mixer. Ozone is generated in bottle A² by means of sparking points 41 and 42, which are electrically connected with an induction or sparking coil. (Not shown.) Terminal 42 is rigidly mounted within a screw-plug 43, which projects through the bottom of the bottle A². Said points can be brought nearer to or farther from each other by adjusting plug 43. A hollow valve-stem 44 with a valve 44' at its bottom, with an opening 45 communicating with passage 4, provides an inlet for air which may be mixed with the ozone in the bottle, or if the air-supply is cut off at valve 2 or 36 pure ozone can pass upward through valve-stem 44 and into any solution-bottle selected to change the character of the solution. An air-inlet connection similar to that shown on bottle A' may also be used, if desired. The addition of an ozone-generating attachment to an apparatus of this kind is very desirable and of great advantage in the treatment of many cases. I do not wish to limit myself to the particular ozone-generator and valve construction as shown, but reserve the right to modify the same within the scope of my claims.

A modified form of back-pressure valve is shown in Fig. 8, wherein a ball-valve 15' is confined between the ends of separate vapor-discharge tubes D and D², which are screwed in bosses H² upon cone mixer head or cap H. Slots $d$ in the end of the tube D within the mixer permit the vapors to pass into mixer when under air-pressure. When there is back pressure from mixer E, the ball finds its seat at the end of outer tube D and closes the vapor-passage leading back to the bottle.

The various parts of the apparatus through which the vapors pass are preferably separable, so that they can be thoroughly cleansed whenever it is necessary.

All the bottles A are of the same form and are preferably made circular with narrow tapering walls, having smaller diameter at the bottom than at the top. The advantage of this construction is that I can use a very small amount of solution and yet obtain perfect vaporization. This is a desirable feature, because some of the medicines or liquids used are very expensive and deteriorate quickly if allowed to stand. With my form of bottle only the amount of solution necessary for a simple treatment is put into the bottle and there is practically no waste.

What I claim is—

1. In an atomizing apparatus, the combination of liquid-receptacles and atomizing-tubes with a mixer having separate vapor connections with said receptacles, and automatic means to prevent the mixed vapors from returning to said receptacles when under back pressure, substantially as described.

2. An atomizing apparatus having separate liquid-atomizing receptacles with a common mixing-chamber connected therewith, an automatically-operated check-valve to seal each receptacle to prevent the mixed vapors in said mixing-chamber from entering said separate atomizing-receptacles when a plurality of receptacles are jointly in use, substantially as described.

3. In an atomizer, the separate receptacles for different liquids, a mixing-chamber having an open connection with each receptacle, and a check-valve for said connections whereby a return movement of the mixed vapor is prevented, substantially as described.

4. In an atomizing apparatus, a series of liquid-atomizing receptacles having a common mixing-chamber with separate vapor connections leading to each receptacle and supported in fixed relation with said chamber on an inclined plane from end to end to drain the condensed vapor back into their respective receptacles, substantially as described.

5. In an atomizing apparatus, the combination of a series of atomizing-receptacles having a common mixing-chamber constructed with converging walls and provided with separate connections leading to each receptacle, substantially as described.

6. In an atomizing apparatus, an air-supply connection and a series of atomizing-receptacles open thereto, and a common mixing-chamber constructed with converging walls terminating in an apex and provided with separate vapor connections leading from each receptacle to said apex, substantially as described.

7. An atomizing apparatus comprising a common mixing-chamber for said receptacles constructed with a cone-shaped bottom, and separate vapor connections leading from each receptacle to said mixing-chamber, substantially as described.

8. In an atomizing apparatus, a series of liquid-atomizing receptacles having a common mixing-chamber, and means to drain said mixer of condensed vapor, substantially as described.

9. An atomizing apparatus comprising a series of liquid-atomizing receptacles having a common mixing-chamber, a discharge-pipe and valve therefor leading from said chamber, and drain-off connection in the bottom of said chamber, substantially as described.

10. In an atomizing apparatus, a plurality of atomizing-bottles having a common mixing-chamber constructed with a cone shell, and separate connections from each bottle leading to the apex of said shell and whereby the vapors from the bottle are brought together and mixed, substantially as described.

11. In an atomizing apparatus, a plurality of atomizing-bottles, in combination with a mixer having separate vapor connections with said bottles, an air-supply having a series of valved air-outlet connections between its ends and leading to said bottles, and valved air connections at opposite ends of said supply-tube, substantially as described.

12. In an atomizing apparatus, a plurality of atomizing-bottles, a mixing-receptacle, separate connections from each bottle to said receptacle, a vapor-discharge outlet for said receptacle, and a pair of valves to control the passage of vapor through said outlet, one of said valves being constructed to open said outlet for the free passage of vapors, and the other valve constructed to permit an interrupted flow of vapor, substantially as described.

13. In an atomizing apparatus, a plurality of atomizing-bottles, a mixing-receptacle, a vapor-tube leading from each bottle to said receptacle, and a vapor-outlet pipe having a vapor-tight union connection with said receptacle constructed to permit free rotation of said pipe without unlocking, substantially as described.

14. In an atomizing apparatus, a plurality of atomizing-bottles, a mixing-receptacle, separate vapor-discharge connections leading from each bottle of said receptacle, and an automatic back-pressure valve at the outlet end of each of said connections substantially as described.

15. In an atomizing apparatus, a plurality of atomizing-bottles, a vapor-mixing chamber, and vapor connections between said bottles and mixer, in combination with means to heat the vapors in the mixing-chamber, substantially as described.

16. In an atomizing apparatus, a set of atomizing-bottles having compressed-air connection, a vapor-mixing chamber connected with said bottles, and means to heat the air in its passage to said bottles and mixing-chamber, substantially as described.

17. In an atomizing apparatus, a plurality of atomizing-bottles having compressed-air connections, a vapor-mixing receptacle, and vapor-conveying tubes connecting said bottles and vapor-mixing receptacles, in combination with a heating device arranged in the line of the air connection, substantially as described.

18. In an atomizing apparatus, a plurality of atomizing-bottles having air connections, in combination with an ozone-bottle having valved connections with said bottles, and means to generate ozone within said bottle, substantially as described.

19. In an atomizing apparatus, a set of atomizing-bottles having compressed-air-pipe connections, and a vapor-mixer having vapor-tube connections with said bottles, in combination with an ozone-bottle having open connections with said atomizing-bottles and mixer, and means to generate ozone in said bottle, substantially as described.

20. An atomizing apparatus comprising a set of solution-bottles with atomizing-tubes therein, air connections to said bottles, individual vapor-outlet tubes for each bottle, a cone mixer having a removable cap constructed to receive said outlet-tubes, vapor-outlet passages in said cap, and means to control the outgoing vapors through said passages, substantially as described.

21. An atomizing apparatus comprising a plurality of solution-bottles having atomizing-tubes adjustably supported to be raised and lowered and having operative connections outside of said bottles to raise and lower said tubes in respect to the level of the solution within said bottles, vapor-outlet tubes for said bottles, and a mixing-chamber for the outgoing vapors, substantially as described.

22. An atomizing-tube for atomizing apparatus having a main vertical passage with an upwardly-inclined duct open thereto, said duct having open communication with the outside of said tube at different elevations, substantially as described.

23. In an atomizing apparatus, a solution-bottle having an air connection, a cover for said bottle, and an atomizing-tube supported to slide within said cover and having operative connections outside said bottle to adjust said tube to varying elevations in respect to the level of the solution, substantially as described.

24. In an atomizing apparatus, a solution-bottle having an air connection at its top provided with a tubular bearing, and a tube within said bearing and bottle provided with air inlet and outlet openings and adapted to act both as an air-valve and atomizer, substantially as described.

25. In an atomizing apparatus, a solution-bottle having an air-supply connection, in combination with an atomizing-tube open to the air-supply and provided with air-outlet openings at its lower end to agitate the solution in the bottle, substantially as described.

26. In an atomizing apparatus, a solution-bottle having compressed-air connections, in combination with an atomizing-tube provided with an air-outlet and constructed to be lowered into the solution to submerge said outlet, substantially as described.

27. In an atomizing apparatus, a solution-bottle having an air connection and a vapor-outlet, and an adjustable atomizing-tube supported within said bottle having operative connections outside said bottle to adjust said tube to varying elevations in respect to the level of the solution, substantially as described.

28. In an atomizing apparatus, a solution-bottle having an air connection and a vapor-outlet, and adjustable atomizing means within said bottle having operative connections outside said bottle whereby the degree of atomization can be changed at will, substantially as described.

Witness my hand to the foregoing specification this 19th day of August, 1902.

GEORGE W. HOPKINS.

Witnesses:
R. B. MOSER,
A. N. MOSER.